United States Patent [19]
Rogers et al.

[11] 3,718,557
[45] Feb. 27, 1973

[54] PROCESS OF MAKING $ClF_3O$

[75] Inventors: Howard H. Rogers, Woodland Hills; Donald Pilipovich, Canoga Park, both of Calif.

[73] Assignee: North American Rockwell Corporation

[22] Filed: Dec. 6, 1967

[21] Appl. No.: 688,628

[52] U.S. Cl. ................................204/157.1, 23/203
[51] Int. Cl. ................................................B01j 1/00
[58] Field of Search .....................204/157.1; 23/203

[56] References Cited

UNITED STATES PATENTS 3,285,842  11/1966  Grosse et al. ..................204/157.1

*Primary Examiner*—Reuben Epstein
*Attorney*—William R. Lane, Thomas S. MacDonald and Richard L. Mikesell

[57] ABSTRACT

Production of $ClF_3O$ by reacting under ultraviolet light a compound selected from the group consisting of $ClF_2F$ and $ClO_3F$ with a compound selected from the group consisting of $ClF_5$, $ClF_3$, $ClF$, $OF_2$ and $F_2$.

4 Claims, No Drawings

PROCESS OF MAKING ClF₃O

The Invention herein described was made in the course of or under a contract with the Department of the Navy.

REFERENCES TO RELATED APPLICATIONS

This invention is related to co-pending application Ser. No. 543,493 filed Apr. 13, 1966, in the names of D. Pilipovich, R. D. Wilson, and H. F. Bauer, having a common assignee.

BACKGROUND OF THE INVENTION

In the constant search for high energy liquid rocket oxidizers, fluorine and its energetic compounds has been the object of much investigation.

PRIOR ART

Co-pending application, Ser. No. 543,493, describes and claims a new fluorine oxidizer, oxychlorine trifluoride ($ClF_3O$), and a method for its manufacture. The compound $ClF_3O$ is attractive as an oxidizer, particularly for use in rocket engines. Its advantages include low bond energies and relatively good storability. However, the method of synthesis in that case, although satisfactory for laboratory production, may not be as economical as might be desired for large scale production.

It is an object of this invention to provide an improved process for the synthesis of $ClF_3O$.

Other and more specific advantages of this invention will become apparent from the following description:

SUMMARY OF THE INVENTION

The process of the instant invention can be summarized by the following equation:

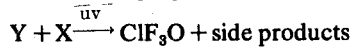

$$Y + X \xrightarrow{uv} ClF_3O + \text{side products}$$

where X is a compound selected from the group consisting of $ClF_5$, $ClF_3$, $ClF$, $OF_2$ and $F_2$, and Y is $ClO_2F$ or $ClO_3F$. The uv represents the input of ultraviolet energy. The reactants should preferably be present in near stoichiometric ratios. Of course, much smaller or larger ratios will not preclude the reaction of the instant invention, but percent yields will be small when less than the stoichiometric amount of fluorine is used.

The reaction of the instant invention should take place at reduced temperatures. Generally, temperatures of between −80° and +10°C are considered to be suitable. However, temperatures of between −60°C and −40°C are preferred. The reaction mixture is preferably at autogenetic pressure. The reaction should take place in a highly resistant container such as stainless steel, nickel, or Monel, due to the corrosive nature of the reactants. Although some reaction takes place immediately, it is usually preferred to irradiate from ¼ to 3 hours.

As is known to those skilled in the art, the radiant energy imparted by a source is proportional to the wave length of that radiant energy. However, if radiant energy is to promote a reaction, it must be of a wave length that can be absorbed by one or more of the reactants. It is these criteria that must be kept in mind if a narrow spectrum of ultraviolet light is used in the reaction of the instant invention. In practice a wide spectrum ultraviolet source, for instance, a mercury vapor lamp, has been found to be satisfactory in the syntheses of the instant invention. The absorbance of this reaction was investigated between about 1,900 and about 3,100 angstroms. Above about 3,100 angstroms the recited compounds do not appreciably absorb light. Below about 1,900 angstroms a vacuum or He-filled uv apparatus must be used as atmospheric oxygen begins to absorb ultraviolet radiation at about that point. In an apparatus using a sapphire window ultraviolet emissions down to about 1,650 angstroms can be used. In an apparatus using a lithium fluoride window radiations down to about 1,200 angstroms can be used. Both sapphire and lithium fluoride are resistant to the reactants and products of the instant invention. Such low wave lengths are somewhat uncommon although their use is contemplated within the scope of the invention.

It has been found that the compound ClF has a maximum point of absorbance at a wave length of about 2,730 angstroms. The compound $ClF_3$, on the other hand, appears not to have a maximum but rather a steadily increasing absorbance coefficient towards shorter wave lengths. Similarly, the compound $OF_2$ has a steadily increasing absorbance coefficient towards shorter wave lengths. However, the compound $ClF_5$ has a maximum absorbance of between 2,000 and 2,100 angstroms, and fluorine has a maximum absorbance at about 2,845 angstroms.

After reaction, the resultant $ClF_3O$ can be separated from any side products by conventional means. Fractional condensation has been found to be satisfactory. $ClF_3O$ freezes at about −37°C.

While the reaction was run experimentally in a batch type process, it can be readily performed in a flow operation. In this type of operation, the reactants in the gaseous state would be mixed, radiated and then passed into a cold zone for condensation and separation of the desired product.

The reaction of the instant invention is illustrated by the following typical syntheses in which a 100 w. utility mercury vapor lamp was placed one-eighth inch from a sapphire window in a cooled nickel batch reactor:

TABLE I

Ultraviolet Activated Reactions

| Reactants | Mole Ratio (to 1) | Temp C | Time, hr | Condensible Products, Mole Percent (Conversion) (a) |
|---|---|---|---|---|
| $F_2$,$FClO_2$ | 12.8 | −60 | 5.4 | $ClF_3O$, 14; $ClF_5$, 59 |
| $F_2$,$FClO_2$ | 5.6 | −60 | 2.5 | $ClF_3O$, 5.0; $ClF_5$, 26 |
| $F_2$,$FClO_2$ | 1.1 | −60 | 4.2 | $ClF_3O$, 36; $ClF_5$, 8; $ClF_3$, 22; $FClO_3$, 6 |
| $OF_2$,$FClO_2$ | 1.0 | −60 | 4.1 | $ClF_3O$, 20; $ClF_3$, 17; $ClF$, 57 |
| $ClF$,$FClO_2$ | 2.0 | −60 | 4.1 | $ClF_3O$, 26; $ClF_3$, $Cl_2$ |
| $ClF_3$,$FClO_2$ | 1.0 | −60 | 4.1 | $ClF_3O$, 28; $ClF$ |
| $ClF_5$, $FClO_2$ | 1.0 | −60 | 4.0 | $ClF_3O$, 70; $ClF_3$ |
| $ClF_5$, $FClO_2$ | 1.0 | −60 | 3 | $ClF_3O$, 63; $ClF_3$; $ClF$, 15 |
| $ClF_5$,$FClO_3$ | 1.0 | −40 | 1 | $ClF_3O$, 63.2; $FClO_3$, 29.7 |
| $F_2$,$FClO_3$ | 1.0 | −60 | 1 | $ClF_3O$, 30 |

(a) All products were determined quantitatively but values are listed only if origin of product was only from compound being fluorinated.

It should be noted that the tabulated experiments were merely examples and the experiment was usually run at −60°C due to the nature of the apparatus. The actual limitations on temperatures are as previously set forth.

Since it is obvious that many changes and modifications can be made in the above described details without departing from the nature and spirit of the invention, it is to be understood that the invention is not to be limited thereto except as set forth in the appended claims.

We claim:
1. The process of making $ClF_3O$ comprising irradiating with ultraviolet light a mixture at between $-80°C$ $+10°C$ of a first compound selected from the group consisting of $ClO_2F$ and $ClO_3F$ and a second compound selected from the group consisting of $ClF_3$, $ClF_5$, $ClF$, $OF_2$ and $F_2$, thereby causing reaction, forming $ClF_3O$ and subsequently separating said $ClF_3O$.

2. The process of claim 1 wherein the mixture of reactants is at between $-60°C$ and $-40°C$.

3. The process of claim 1 wherein the first compound is $ClO_2F$.

4. The process of claim 2 wherein the first compound is $ClO_2F$.

* * * * *